United States Patent
Dhaliwal

(10) Patent No.: US 10,078,139 B2
(45) Date of Patent: Sep. 18, 2018

(54) DEVICE AND METHOD FOR TRACKING COMPLIANCE INFORMATION OF A RIDER

(71) Applicant: HCL Technologies Limited, Uttar Pradesh (IN)

(72) Inventor: Jasbir Singh Dhaliwal, Uttar Pradesh (IN)

(73) Assignee: HCL TECHNOLOGIES LTD. (IN)

(*) Notice: Subject to any disclaimer, the term of this patent is extended or adjusted under 35 U.S.C. 154(b) by 75 days.

(21) Appl. No.: 15/056,357

(22) Filed: Feb. 29, 2016

(65) Prior Publication Data

US 2016/0274244 A1 Sep. 22, 2016

(30) Foreign Application Priority Data

Mar. 19, 2015 (IN) .............................. 754/DEL/2015

(51) Int. Cl.
*G01S 19/42* (2010.01)
*G01S 19/24* (2010.01)
*A42B 3/04* (2006.01)

(52) U.S. Cl.
CPC .......... *G01S 19/428* (2013.01); *A42B 3/0466* (2013.01); *G01S 19/24* (2013.01)

(58) Field of Classification Search
None
See application file for complete search history.

(56) References Cited

U.S. PATENT DOCUMENTS 5,294,914 A * 3/1994 Dallas ....................... B62J 3/00
340/432

6,029,102 A * 2/2000 Elsman ................. B60R 25/104
340/468

(Continued)

FOREIGN PATENT DOCUMENTS

| CN | 203243996 | 10/2013 |
|----|-----------|---------|
| CN | 203318625 | 12/2013 |
| CN | 203723505 | 7/2014 |

OTHER PUBLICATIONS

Amitava Das et al, Smart Helmet for Indian Bike Riders, International Journal of Advances in Science Engineering and Technology, Oct. 2014, p. No. 54-56, vol. 2, Issue-4, India.

(Continued)

*Primary Examiner* — Nicholas K Wiltey
(74) *Attorney, Agent, or Firm* — Hayes Soloway P.C.

(57) ABSTRACT

A helmet for tracking compliance information associated with a rider is disclosed. The helmet comprising a Global Positioning System (GPS) configured to trace a complete path covered by the rider. Further, the helmet comprises a set of biometric sensor configured to capture biometric sample of the rider at regular intervals, when the rider is in motion. Furthermore, the helmet comprises a data processing platform. The data processing platform maintains a database configured to store a profile data of the rider such as biometric information and identity profile of the rider. The data processing platform enables a biometric data analysis module configured to classify the complete path into a compliant path and a non-compliant path by analyzing the biometric information and biometric samples captured from the rider. Further, the data processing platform enables a data transmission module to transmit the compliant path and the non compliant path to a remote server.

8 Claims, 4 Drawing Sheets

(56) References Cited

U.S. PATENT DOCUMENTS

| | | | |
|---|---|---|---|
| 6,810,480 B1 | 10/2004 | Parker et al. | |
| 9,146,124 B2 | 9/2015 | Parada et al. | |
| 9,427,039 B2* | 8/2016 | Eustace | A42B 3/0466 |
| 2002/0070881 A1* | 6/2002 | Marcarelli | G01S 5/0027 340/988 |
| 2003/0071766 A1* | 4/2003 | Hartwell | A42B 3/30 345/8 |
| 2003/0197608 A1* | 10/2003 | Rudhard | A42B 3/046 340/539.18 |
| 2007/0245465 A1* | 10/2007 | Neal | A42B 3/0406 2/414 |
| 2010/0095439 A1* | 4/2010 | Nolan | A42B 3/286 2/421 |
| 2010/0102970 A1* | 4/2010 | Hertz | A42B 3/046 340/573.1 |
| 2010/0298683 A1* | 11/2010 | Cabrera | A61B 5/0002 600/364 |
| 2011/0099031 A1* | 4/2011 | Nair | G06F 19/3418 705/3 |
| 2012/0188083 A1* | 7/2012 | Miller, II | A42B 3/046 340/573.1 |
| 2013/0057391 A1* | 3/2013 | Salvador | G06K 7/10237 340/10.1 |
| 2013/0201081 A1* | 8/2013 | Evans | G09G 5/02 345/8 |
| 2014/0000013 A1* | 1/2014 | Redpath | A42B 3/04 2/422 |
| 2014/0167986 A1* | 6/2014 | Parada | G01C 21/365 340/905 |
| 2015/0088431 A1* | 3/2015 | Podhajsky | A61B 5/0059 702/19 |
| 2015/0097772 A1* | 4/2015 | Starner | G06F 3/013 345/158 |
| 2015/0156567 A1* | 6/2015 | Oliver | H04Q 9/00 340/870.07 |
| 2016/0007849 A1* | 1/2016 | Krueger | A61B 3/113 600/301 |
| 2016/0044276 A1* | 2/2016 | Shearman | A42B 3/0426 348/207.1 |
| 2016/0073722 A1* | 3/2016 | Eustace | A42B 3/0466 340/539.13 |
| 2016/0206033 A1* | 7/2016 | Chan | A42B 3/0433 |
| 2016/0223577 A1* | 8/2016 | Klosinski, Jr. | G01P 3/50 |
| 2016/0248995 A1* | 8/2016 | Mullins | H04N 7/185 |
| 2017/0039960 A1* | 2/2017 | Jepsen | G02B 27/0172 |
| 2017/0092232 A1* | 3/2017 | Mullins | G09G 5/18 |

OTHER PUBLICATIONS

Manjesh N & Sudarshan Raj, Smart Helmet Using GSM &GPS Technology for Accident Detection and Reporting System, International Journal of Electrical and Electronics Research, Dec. 2014, p. No. 122-127, vol. 2, Issue 4, India.

* cited by examiner

DEVICE AND METHOD FOR TRACKING COMPLIANCE INFORMATION OF A RIDER

CROSS-REFERENCE TO RELATED APPLICATIONS AND PRIORITY

The present application claims benefit from Indian Complete Patent Application No. 754/DEL/2015, filed on Mar. 19, 2015, the entirety of which is hereby incorporated by reference.

TECHNICAL FIELD

The present disclosure in general relates to the field tracking information. More particularly, the present disclosure relates to a device and method for tracking compliance information associated with a rider.

BACKGROUND

In most of the developing countries, road fatalities are increasing at an alarming rate. One of the major reasons for road fatalities is that motorists are not wearing helmets while driving. As per current statistics, a lot of fatalities can be reduced or eliminated in case motorists wear helmets while riding two-wheeler. Even after running multiple education campaigns by the government bodies, the message hasn't been well received by motorists and there are escalating numbers of road fatalities witnessed each year. Almost all countries have strict rules related with wearing of helmets. However the compliance to these rules still remains a challenge. One of the ways to ensure full compliance is to track on a continuous basis, the activities of the motorist.

Therefore, it has become necessary to ensure proactive compliance rather than using reactive measures like issuing tickets to the motorist, levying penalties etc. by the traffic authority. Further, it is necessary to collect data of the complete journey of the motorist and accordingly worn the motorist for his non compliance. Further, in order to trace compliance information of a motorist, it is necessary to enable a device with sufficient intelligence to gather compliance data of the motorist, when the motorist is riding the bike and transmit all this information in real time to backend server in order to alert the traffic police/department of any lacuna on the part of motorist with regards to traffic compliance and wearing of helmets.

SUMMARY

This summary is provided to introduce aspects related to device and method for tracking compliance information associated with a rider, further described below in the detailed description. This summary is not intended to identify essential features of the claimed subject matter nor is it intended for use in determining or limiting the scope of the claimed subject matter.

In one implementation, a helmet for tracking compliance information associated with a rider is disclosed. The helmet comprising a Global Positioning System (GPS) configured to trace a complete path covered by the rider. Further, the helmet comprises a set of biometric sensor configured to capture biometric sample of the rider at regular intervals, when the rider is in motion. Furthermore, the helmet comprises a data processing platform. The data processing platform maintains a database, wherein the database is configured to store a profile data associated with the rider, wherein the profile data includes biometric information and identity profile of the rider. Further, the data processing platform enables a biometric data analysis module, wherein the biometric data analysis module is configured to classify the complete path into a compliant path and a non-compliant path by analyzing the biometric information and biometric samples captured by the set of biometric sensors. Further, the data processing platform enables a data transmission module. The data transmission module is configured to transmit the compliant path and the non compliant path to a remote server. The remote server may be accessed by the traffic authority and monitor the compliance level of each rider based on the compliant path and the non-compliant path covered by the rider.

In one implementation, a method for tracking compliance information associated with a rider using a helmet is disclosed. In the first step, a Global Positioning System (GPS) embedded in the helmet is configured to trace a complete path covered by the rider. In the next step, a set of biometric sensor enabled over the helmet are configured to capture biometric sample of the rider at regular intervals, when the rider is in motion. Further, a profile data associated with the rider is stored in a database enabled by a data processing platform associated with the helmet, wherein the profile data includes biometric information and identity profile of the rider. In the next step, the complete path is classified into a compliant path and a non-compliant path by a biometric data analysis module, by analyze the biometric information and the biometric samples captured from the rider, wherein the biometric data analysis module is enabled by the data processing platform. In the last step, the compliant path and the non compliant path covered by the rider is transmitted to a remote server by a data transmission module that is enabled by the data processing platform. The remote server may be accessed by the traffic authority and monitor the compliance level of each rider based on the compliant path and the non-compliant path covered by the rider.

BRIEF DESCRIPTION OF DRAWINGS

The detailed description is described with reference to the accompanying Figures. In the Figures, the left-most digit(s) of a reference number identifies the Figure in which the reference number first appears. The same numbers are used throughout the drawings to refer like/similar features and components.

DETAILED DESCRIPTION

The present disclosure relates to a helmet for tracking compliance information associated with a rider. The helmet comprising a Global Positioning System (GPS), a set of biometric sensors, and a data processing platform. The GPS is configured to trace a complete path covered by the rider. Further, the set of biometric sensors are configured to capture biometric sample of the rider at regular intervals, when the rider is in motion. Furthermore, the data processing platform maintains a database configured to store a profile data associated with the rider, wherein the profile data includes biometric information and identity profile of the rider. Further, the data processing platform enables a biometric data analysis module, wherein the biometric data analysis module is configured to classify the complete path into a compliant path and a non-compliant path by analyzing the biometric information and biometric samples captured from the rider. Further, the data processing platform enables a data transmission module. The data transmission module is configured to transmit the compliant path and the non compliant path to a remote server. The remote server may be accessed by the traffic authority and monitor the compliance level of each rider based on the compliant path and the non-compliant path covered by the rider.

Figure 1:
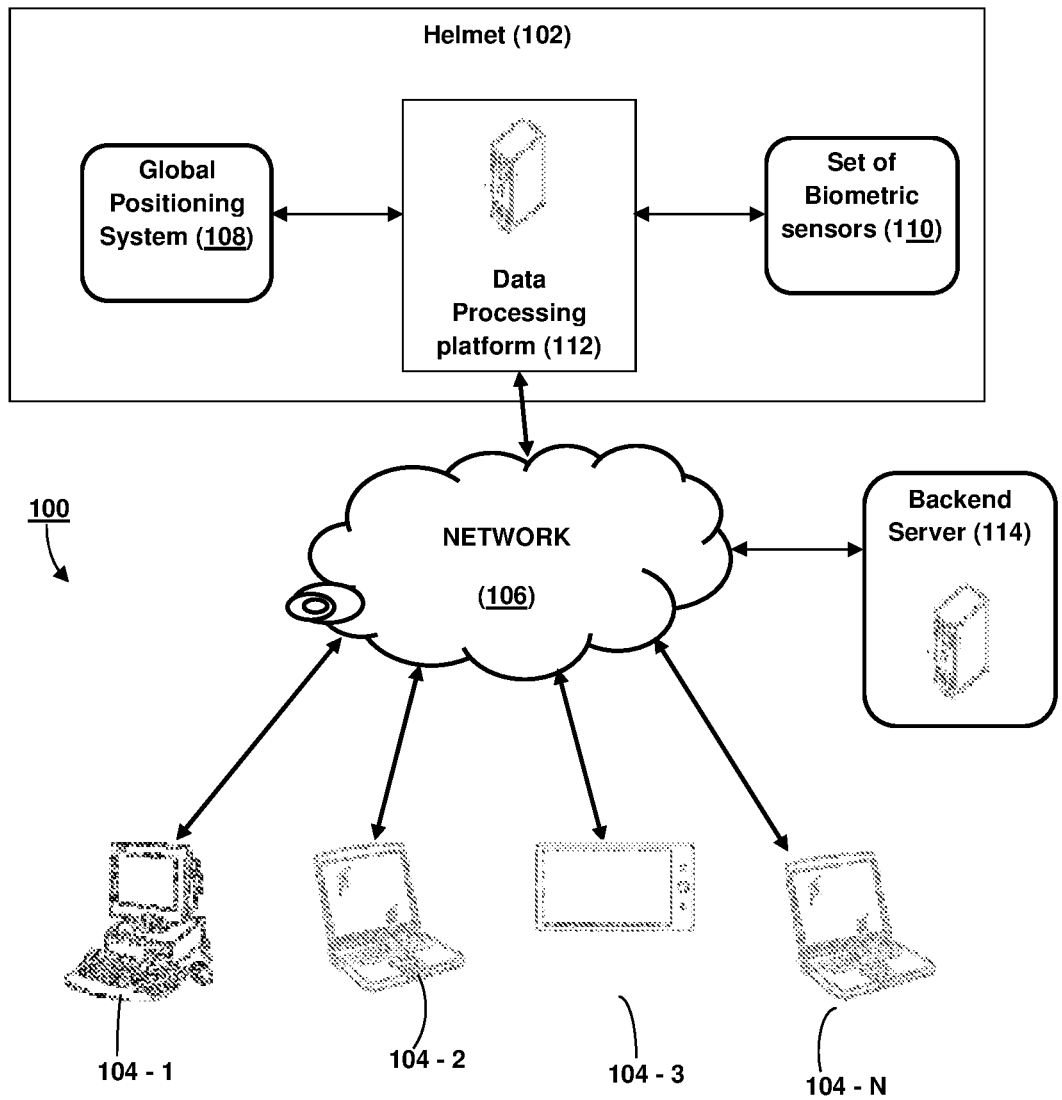
FIG. 1 illustrates a network implementation of a helmet for gathering compliance information of a rider, in accordance with an embodiment of the present disclosure.

Referring now to FIG. 1, a network implementation 100 of a helmet 102 for monitoring compliance information is illustrated, in accordance with an embodiment of the present disclosure. The helmet 102 comprises a Global Positioning System 108, a set of sensors 110, a data processing platform 112, and a battery or a solar panel (not shown) for operating the data processing platform 112. Although the present disclosure is explained by considering that the data processing platform 112 is implemented as a software program over a embedded system present inside the helmet 102, it may be understood that the embedded system may be installed in a vehicle of the rider and can communicate with the GPS 108 and the set of sensors 110 using communication channels such as Bluetooth, Wi-Fi, NFC, Infrared communication and the like. It will be understood that the data processing system 112 may be accessed by multiple users such as traffic authority, traffic police, or highway police through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a hand-held device, and a workstation. The user devices 104 are communicatively coupled to the data processing system 112 through a network 106. Further, the data processing system 112 is also connected to a remote server 114 through the network 106. In one embodiment, the remote server 114 is configured to store historical compliance data associated with the riders. The user devices 104 can be used by the traffic authority to access the historical compliance data of the riders, stored over the remote server 114.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
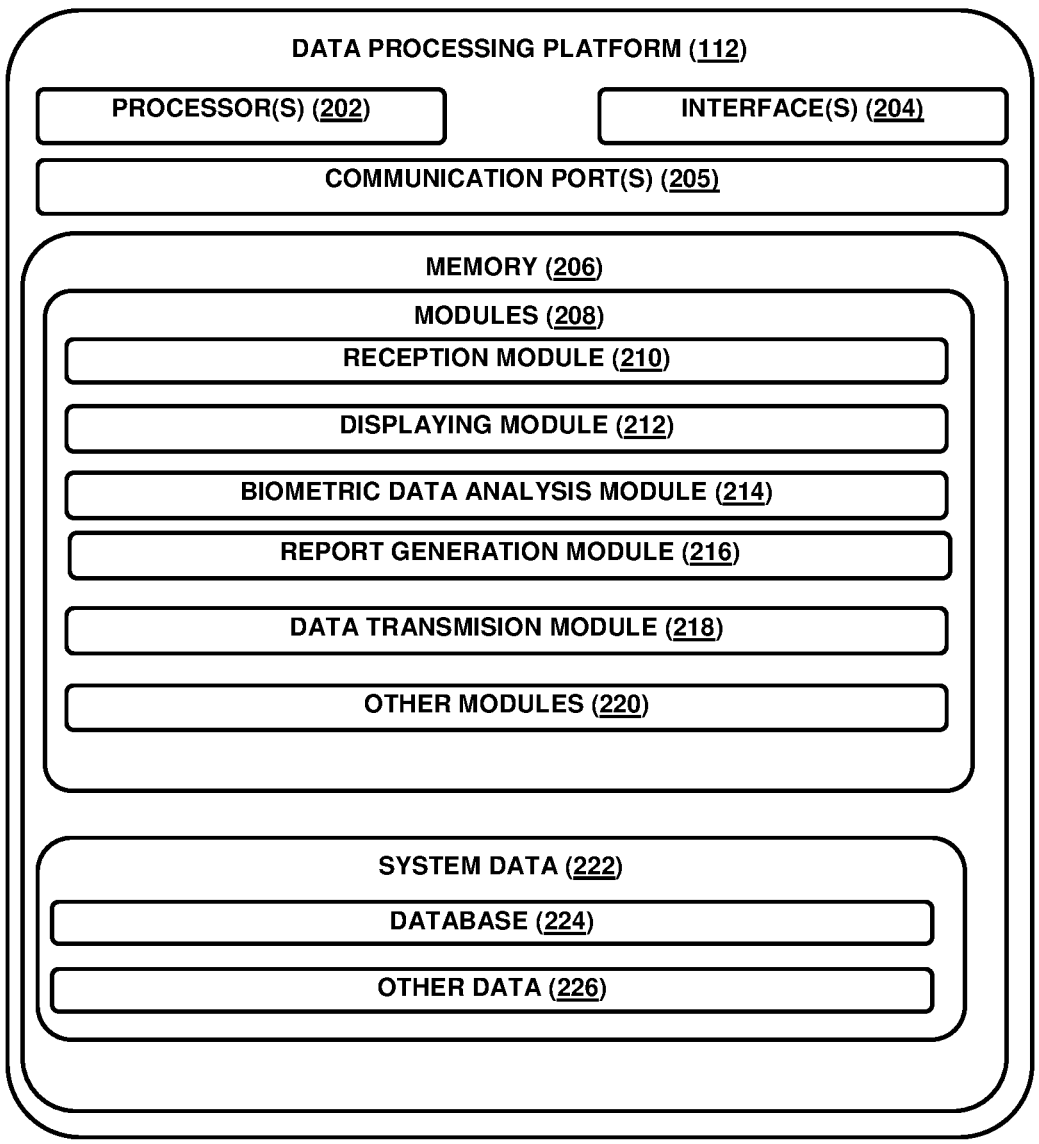
FIG. 2 illustrates the data processing system present in the helmet, in accordance with an embodiment of the present disclosure.

Referring now to FIG. 2, the data processing system 112 is illustrated in accordance with an embodiment of the present disclosure. In one embodiment, the data processing system 112 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the data processing system 112 to interact with a user directly or through the user devices 104. Further, the I/O interface 204 may enable the data processing system 112 to communicate with other computing devices, such as the remote server 114, web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and system data 222.

The modules 208 include routines, programs, objects, components, data structures, etc., which perform particular tasks or implement particular abstract data types. In one implementation, the modules 208 may include a reception module 210, a displaying module 212, a biometric data analysis module 214, a report generation module 216, a data transmission module 218, and other modules 220. The other modules 220 may include programs or coded instructions that supplement applications and functions of the data processing system 112.

The system data 222, amongst other things, serves as a repository for storing data processed, received, and generated by one or more of the modules 208. The system data 222 may also include a database 224 and other data 226. The other data 226 may include data generated as a result of the execution of one or more modules in the other modules 220. Further, the database 224 is configured to store a profile data associated with the rider, wherein the profile data includes biometric information and identity profile of the rider. The identity profile of the rider includes a license number, name, and address of the rider. Further, the biometric information includes at least one retina image captured from the rider. The at least one retina image may be stored in an encrypted form in order to remove the possibility of any tampering by the rider.

In one embodiment, the process of tracking the compliance information associated with the rider starts with identifying whether the rider is in motion. In one embodiment, the data processing system 112 interacts with the GPS 108 and identifies whether the rider is in motion. If the rider is in motion, the data processing system 112 signals the GPS 108 to trace the path travelled by the rider. The entire path travelled by the rider is hereafter referred to as complete path. Further, when the rider is in motion, the data processing system 112 also signals the set of biometric sensors 110 to capture biometric samples at regular intervals and transmit these biometric samples to biometric data analysis module 214.

In one embodiment, the set of biometric sensors 110 is a pair of cameras fitted inside the helmet 102 and is configured to capture biometric samples at regular interval. The pair of cameras is installed in the helmet such that the pair of cameras can accurately capture biometric samples in the form of retina images of the rider at regular intervals when the rider is wearing the helmet. If the rider is not wearing the helmet, then the pair of cameras will not capture the retina images of the rider. In other words, whenever the rider is wearing the helmet, the pair of camera is focused on the eyes of the rider, hence the pair of cameras capture the retina images of the rider after each interval. On the contrary, whenever the rider is not wearing the helmet, the pair of cameras is not focused on the eyes of the rider and will not capture the retina images of the rider after each interval, since eyes are not present in the focus of the pair of cameras.

Once the set of biometric sensors 110 transfers the biometric samples in the form of retina images captured at regular intervals to the biometric data analysis module 214, the biometric data analysis module 214 compares the retina images captured after each interval with the biometric information that is stored in the database 224. If the biometric data analysis module 214 identifies that there is a perfect match between the retina images captured after and before an interval and the at least one retina image stored in the biometric information associated with the rider, then the path covered by the rider in this interval is identified as a compliant path. Further, the path covered by the rider in an interval is identified as a non-compliant path if there is no match identified between the retina images captured before and after the interval and the at least one retina image stored in the biometric information. In a similar manner, the complete path travelled by the rider is divided into small segments called as intervals and classified as compliant interval and non compliant interval. All the compliant intervals identified from the complete path are clubbed together as a compliant path, whereas all the non compliant intervals identified from the complete path are clubbed together as a non compliant path. The compliant path is indicative of path covered by the rider while wearing the helmet and the non compliant path is indicative of a path covered by the rider without wearing the helmet. This information is stored by the data processing system 112 in the database 224. Further, the report generation module 216 of the data processing system 112 is configured to generate compliance reports of the rider based on the information associated with the compliant path and non-compliant path covered by the rider. Further, the data transmission module is configured to transmit the reports generated by the compliance report generation module 216 to the remote server 114. Further, traffic authority may use the client devices 104 to access the compliance reports stored at the remote server 114. In a similar manner, compliance reports associated with different riders can be gathered and stored at the remote server 114 which may then be used by the traffic authority to charge fine or reword the riders based on their compliance reports. Further, the method for capturing compliance information associated with the rider is elaborated with reference to the flowchart of FIG. 3.

Figure 3:
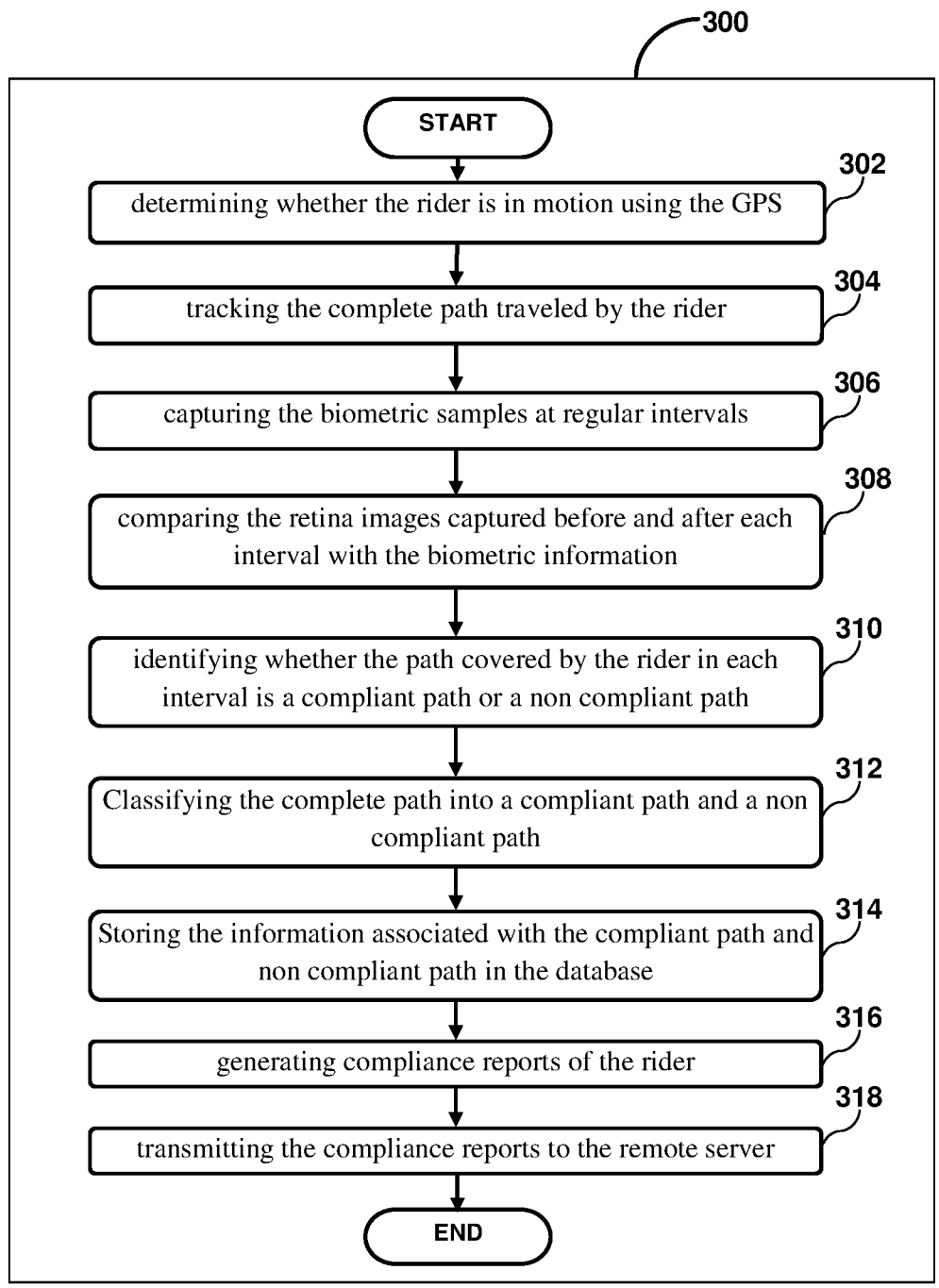
FIG. 3 illustrates a method for gathering compliance information of a rider, in accordance with an embodiment of the present disclosure.

FIG. 3 represents a method for tracing compliance information associated with a rider. At step 302, the GPS 108 is configured to determine whether the rider is in motion. In one embodiment, the data processing system 112 interacts with the GPS 108 and identifies whether the rider is in motion.

At step 304, if the rider is in motion, the data processing system 112 signals the GPS 108 to trace the path travelled by the rider. The entire path travelled by the rider is hereafter referred to as complete path.

At step 306, when the rider is in motion, the data processing system 112 signals the set of biometric sensors 110 to capture biometric samples at regular intervals and transmit these biometric samples to biometric data analysis module 214. In one embodiment, the set of biometric sensors 110 is a pair of cameras fitted inside the helmet 102 and is configured to capture biometric samples at regular interval. The pair of cameras is installed in the helmet such that the pair of cameras can accurately capture biometric samples in the form of retina images of the rider at regular intervals when the rider is wearing the helmet. If the rider is not wearing the helmet, then the pair of cameras will not capture the retina images of the rider.

At step 308, the biometric data analysis module 214 compares the retina images captured before and after each interval with the biometric information that is stored in the database 224.

At step 310, the biometric data analysis module 214 identifies whether the path covered by the rider in each interval is a compliant path or a non compliant path. For this purpose, if the biometric data analysis module 214 identifies that there is a perfect match between the retina images captured after and before an interval and the at least one retina image stored in the biometric information associated with the rider, then the path covered by the rider in this interval is identified as a compliant path. Further, the path covered by the rider in an interval is identified as a non-compliant path if there is no match identified between the retina images captured before and after the interval and the at least one retina image stored in the biometric information. In a similar manner, the complete path travelled by the rider is divided into small segments called as intervals and classified as compliant interval and non compliant interval.

In step 312, all the compliant intervals identified from the complete path are clubbed together as a compliant path, whereas all the non compliant intervals identified from the complete path are clubbed together as a non compliant path. The compliant path is indicative of path covered by the rider while wearing the helmet and the non compliant path is indicative of a path covered by the rider without wearing the helmet.

At step 314, the information associated with the compliant path and non compliant path is stored by the data processing system 112 in the database 224.

At step 316, the report generation module 216 of the data processing system 112 is configured to generate compliance reports of the rider based on the information associated with the compliant path and non-compliant path covered by the rider.

At step 318, the data transmission module 218 is configured to transmit the compliance reports generated by the compliance report generation module 216 to the remote server 114.

In a similar manner, compliance reports associated with different riders can be gathered and stored at the remote server 114 which may then be used by the traffic authority to charge fine or reword the riders based on their compliance reports. The compliance reports may be generated on the bases of weekly, monthly noncompliance trends, list of repeat offenders etc. In one embodiment, the data processing unit 112 captures the compliance information in real time and alerts the traffic authority about the noncompliance of the rider and the duration for which the rider was driving without wearing the helmet 102.

Figure 4:
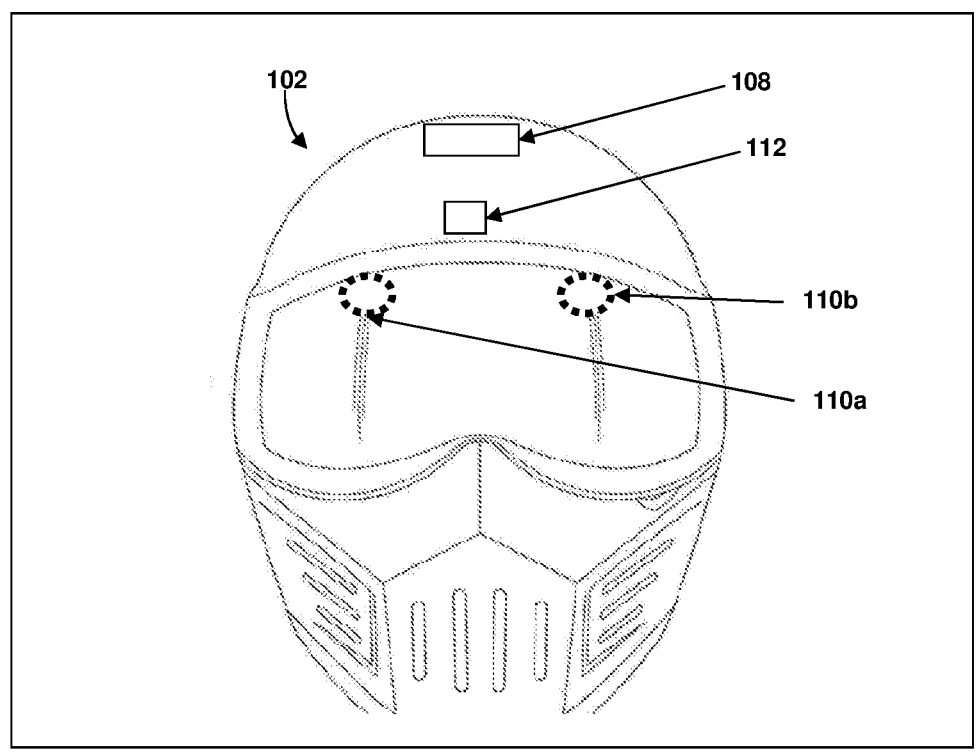
FIG. 4 illustrates the helmet for monitoring compliance level of a rider, in accordance with an embodiment of the present disclosure.

FIG. 4 represent the helmet 102 for monitoring compliance level of a rider, in accordance with an embodiment of the present invention. The helmet comprising a Global Positioning System (GPS) 108 configured to trace a complete path covered by the rider. Further, the helmet 102 comprises of two cameras 110a and 110b positioned in such a manner so as to capture biometric sample in the form of retina images on regular intervals. These cameras 110a and 110b are connected to a data processing system 112 present in the helmet. The biometric data analysis module present in the data processing system 112 is configured to compare the images received from cameras 110a and 110b with those present in the database. If there is a match then the data processing system 112 records the path covered by the user as a compliant path. Further, if there is no perfect match, then the path covered by the user is recorded as non compliant path. This information is transmitted using SIM embedded inside the helmet to send the data in real time to the remote server. The remote server can then issue notifications to the concerned patrol parties, traffic police to take suitable actions against offenders/rider. In one embodiment, profile data associated with more than one rider can be stored over the database 224. Further, the helmet 102 is equipped with a rotary switch (not shown) to switch between the multiple rider profiles to enable the use of same helmet among multiple motorists.

Although the present disclosure relates to tracking of compliance information associated with a rider, it is to be understood that the appended claims are not necessarily limited to the specific features or methods described herein. However, the specific features and methods are disclosed as examples of implementations for tracking of compliance information associated with a rider.

I claim:

1. A helmet for tracking compliance information associated with a rider, the helmet comprising:
   a Global Positioning System (GPS) configured to trace a complete path covered by the rider, wherein the complete path is divided into one or more intervals;
   a set of biometric sensors configured to capture biometric samples of the rider at each interval from the one or more intervals, when the rider is in motion, wherein the set of biometric sensors include at least one camera, wherein the at least one camera is configured to scan biometric samples in the form of retina images at each interval from the one or more intervals, when the rider is in motion;
   a data processing platform comprising a database configured to store a profile data associated with the rider, wherein the profile data includes biometric information and identity profile of the rider;
   a biometric data analysis module configured to classify the complete path into a compliant path and a non-compliant path, wherein the complete path is classified based on comparison of the biometric information with the biometric samples captured at each interval, wherein the biometric data analysis module is configured to compare the retina images scanned by the at least one camera with the retina images from the biometric information, in order to classify the complete path into the, compliant path and the non compliant path; and
   a data transmission module configured to transmit the compliant path and the non compliant path to a remote server.

2. The helmet of claim 1, wherein the identity profile includes a license number, name, and address of the rider.

3. The helmet of claim 1, wherein the biometric information includes at least one retina image of the rider.

4. The helmet of claim 1, wherein the compliant path is indicative of path covered by the rider while wearing the helmet and the non compliant path is indicative of a path covered by the rider without wearing the helmet, wherein the compliant path is associated with one or more intervals at which the biometric information matches with the biometric samples, and wherein the non-compliant path is associated with one or more intervals at which the biometric information does not match with the biometric samples.

5. A method for tracking compliance information associated with a rider using a helmet, the helmet comprising:
   tracing a complete path covered by the rider using a Global Positioning System (GPS) embedded in the helmet;
   capturing biometric samples of the rider at each interval from the one or more intervals, when the rider is in motion, wherein the biometric samples are captured by a set of biometric sensors installed over the helmet, wherein the set of biometric sensors include at least one camera, wherein the at least one camera is configured to scan biometric samples in the form of retina images at each interval from the one or more intervals, when the rider is in motion;
   storing a profile data associated with the rider in a database, wherein the profile data includes biometric information and identity profile of the rider, and wherein the database is enabled by a data processing platform associated with the helmet;
   classifying by a biometric data analysis module, the complete path into a compliant path and a non-compliant path, wherein the complete path is classified based on comparison of the biometric information with the biometric samples captured at each regular interval, wherein the biometric data analysis module is enabled by the data processing platform, wherein the biometric data analysis module is configured to compare the retina images scanned by the at least one camera with the retina images from the biometric information, in order to classify the complete path into the compliant path and the non compliant path; and
   transmitting the compliant path and the non compliant path to a remote server by a data transmission module, wherein the data transmission module is enabled by the data processing platform.

6. The method of claim 5, wherein the identity profile includes a license number, name, and address associated with the rider.

7. The method of claim 5, wherein the biometric information includes at least one retina image of the rider.

8. The method of claim 5, wherein the compliant path is indicative of path covered by the rider while wearing the helmet and the non compliant path is indicative of a path covered by the rider without wearing the helmet, wherein the compliant path is associated with one or more intervals at which the biometric information matches with the biometric samples, and wherein the non-compliant path is associated with one or more intervals at which the biometric information does not match with the biometric samples.

* * * * *